(12) United States Patent
Kim et al.

(10) Patent No.: US 11,894,193 B2
(45) Date of Patent: Feb. 6, 2024

(54) MULTILAYER ELECTRONIC COMPONENT

(71) Applicant: SAMSUNG ELECTRO-MECHANICS CO., LTD., Suwon-si (KR)

(72) Inventors: Tae Hyeong Kim, Suwon-si (KR); Moon Soo Park, Suwon-si (KR); Ji Hyun Yu, Suwon-si (KR); Jin Woo Jang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 119 days.

(21) Appl. No.: 17/512,076

(22) Filed: Oct. 27, 2021

(65) Prior Publication Data

US 2022/0216008 A1 Jul. 7, 2022

(30) Foreign Application Priority Data

Jan. 4, 2021 (KR) .................. 10-2021-0000511

(51) Int. Cl.
*H01G 4/30* (2006.01)
*H01G 4/12* (2006.01)
*H01G 4/232* (2006.01)
*H01G 4/012* (2006.01)

(52) U.S. Cl.
CPC ............ *H01G 4/1227* (2013.01); *H01G 4/30* (2013.01); *H01G 4/012* (2013.01); *H01G 4/232* (2013.01)

(58) Field of Classification Search
CPC ...... H01G 4/38; H01G 4/1227; H01G 4/2325; H01G 4/248; H01G 4/30
See application file for complete search history.

(56) References Cited

U.S. PATENT DOCUMENTS

| | | | |
|---|---|---|---|
| 9,812,259 B2 * | 11/2017 | Lee | H01G 4/30 |
| 9,859,058 B2 * | 1/2018 | Hong | H01G 4/30 |
| 11,387,044 B2 * | 7/2022 | Lee | H01G 4/1227 |
| 2011/0141660 A1 * | 6/2011 | Jeong | H01G 4/12 |
| | | | 361/321.2 |
| 2012/0262840 A1 * | 10/2012 | Koizumi | H01G 4/12 |
| | | | 361/321.2 |

(Continued)

FOREIGN PATENT DOCUMENTS

| | | |
|---|---|---|
| JP | H09-219339 A | 8/1997 |
| JP | 2002-289456 A | 10/2002 |

(Continued)

*Primary Examiner* — Dion R. Ferguson
(74) *Attorney, Agent, or Firm* — MORGAN, LEWIS & BOCKIUS LLP

(57) ABSTRACT

A multilayer electronic component includes a body including a plurality of first dielectric layers, an active portion in which internal electrodes are alternately disposed, and a cover portion disposed the active portion in a first direction of the body, a direction in which the plurality of first dielectric layers are laminated, and including a second dielectric layer; and an external electrode disposed externally on the body and connected to one of the internal electrodes. The body includes a margin portion covering a side surface of the one of the internal electrodes other than a side surface connected to the external electrode and including a dielectric pattern having a porosity higher than that of one of the plurality of first dielectric layers.

26 Claims, 8 Drawing Sheets

(56) References Cited

U.S. PATENT DOCUMENTS

| | | | |
|---|---|---|---|
| 2013/0076203 A1* | 3/2013 | Saito | H10N 30/50 336/200 |
| 2013/0100578 A1 | 4/2013 | Suh et al. | |
| 2013/0114182 A1* | 5/2013 | Suh | H01G 4/018 361/321.2 |
| 2014/0301015 A1* | 10/2014 | Kim | H01G 4/12 29/25.03 |
| 2015/0070818 A1 | 3/2015 | Tsuru et al. | |
| 2015/0332852 A1 | 11/2015 | Kim et al. | |
| 2015/0348712 A1* | 12/2015 | Lee | H01G 4/30 156/89.12 |
| 2016/0196918 A1* | 7/2016 | Hong | H01G 4/232 361/301.4 |
| 2017/0018363 A1* | 1/2017 | Tanaka | H01G 4/30 |
| 2017/0169952 A1* | 6/2017 | Kato | H01G 4/2325 |
| 2017/0243697 A1* | 8/2017 | Mizuno | H01G 4/1227 |
| 2018/0012702 A1* | 1/2018 | Azuma | H01G 4/248 |
| 2018/0182555 A1* | 6/2018 | Kowase | H01G 4/30 |
| 2018/0261389 A1* | 9/2018 | Sakate | H01G 4/248 |
| 2018/0301281 A1* | 10/2018 | Park | H01G 4/012 |
| 2018/0301282 A1* | 10/2018 | Nishikawa | C04B 35/62272 |
| 2019/0180935 A1* | 6/2019 | Kato | H01G 4/012 |
| 2019/0252120 A1* | 8/2019 | Sakate | B32B 37/10 |
| 2019/0355519 A1* | 11/2019 | Taniguchi | H01G 4/232 |
| 2020/0098519 A1* | 3/2020 | Kusumoto | H01G 4/232 |
| 2020/0168401 A1 | 5/2020 | Song et al. | |
| 2021/0005382 A1* | 1/2021 | Park | H01G 4/012 |
| 2021/0057157 A1* | 2/2021 | Lee | H01G 4/14 |
| 2021/0074479 A1* | 3/2021 | Lee | H01G 4/1227 |
| 2021/0166881 A1* | 6/2021 | Kim | H01G 4/30 |
| 2022/0208452 A1* | 6/2022 | Shin | H01G 4/30 |
| 2022/0216008 A1* | 7/2022 | Kim | H01G 4/30 |

FOREIGN PATENT DOCUMENTS

| | | | |
|---|---|---|---|
| JP | 2004-296884 A | | 10/2004 |
| JP | 2005-072453 A | | 3/2005 |
| JP | 2013-089946 A | | 5/2013 |
| JP | 2015-159140 A | | 9/2015 |
| JP | 2018139253 A | * | 9/2018 |
| KR | 20110065623 A | * | 6/2011 |
| KR | 10-2015-0005975 A | | 1/2015 |
| KR | 10-2018-0115595 A | | 10/2018 |
| KR | 10-2019-0015453 A | | 2/2019 |
| KR | 10-2004767 B1 | | 7/2019 |
| KR | 10-2019-0121225 A | | 10/2019 |
| KR | 10-2089699 B1 | | 3/2020 |
| KR | 10-2149798 B1 | | 9/2020 |

* cited by examiner

MULTILAYER ELECTRONIC COMPONENT

CROSS-REFERENCE TO RELATED APPLICATION(S)

This application claims benefit of priority to Korean Patent Application No. 10-2021-0000511 filed on Jan. 4, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of various electronic products such as an image display device like a liquid crystal display (LCD) or a plasma display panel (PDP), a computer, smartphones, mobile phones and the like, and may charge or discharge electricity.

Such a multilayer ceramic capacitor may be used as a component of various electronic devices as a multilayer ceramic capacitor may have a small size and high capacity, and may be easily mounted. As components of electronic devices have been designed to have a reduced size, demand for miniaturization and high capacity in a multilayer ceramic capacitor have increased.

To implement miniaturization and high capacity of a multilayer ceramic capacitor, a method of configuring an internal electrode and a dielectric layer to have a reduced thickness and laminating the internal electrodes and the dielectric layers in multiple layers may be used. However, due to a difference in physical properties between the alternately laminated dielectric layers and the internal electrodes, especially a difference in reduction rates in sintering, a mismatch between the elements may occur such that reliability of the multilayer ceramic capacitor may be deteriorated.

In this case, differently from a core (active portion) in which the dielectric layer and the internal electrode are alternately disposed, only a dielectric sheet may be present in a margin or a cover portion in which the internal electrode is not disposed, such that a difference may occur in reduction or expansion in burn-out and sintering. Accordingly, deformations such as distortion may occur between the core and the margin or between the core and the cover portion due to non-uniform stress, which may lead to product defects such as cracks or breakage due to reverse connection of the multilayer ceramic capacitor.

Accordingly, along with a technical demand for miniaturization and high capacity of a multilayer ceramic capacitor, a technique for securing reliability of a product by reducing a difference in reduction rates between the core and the margin and between the core and the cover, on which the internal electrode is disposed, may be necessary.

SUMMARY

An aspect of the present disclosure is to provide a multilayer electronic component which may secure reliability by reducing a difference in reduction rates between an active portion and a margin and between an active portion and a cover on which an internal electrode is disposed.

According to an aspect of the present disclosure, a multilayer electronic component includes a body including a plurality of first dielectric layers, an active portion in which internal electrodes are alternately disposed, and a cover portion disposed on the active portion in a first direction of the body, a direction in which the plurality of first dielectric layers are laminated, and including a second dielectric layer; and an external electrode disposed externally on the body and connected to one of the internal electrodes. The body includes a margin portion covering a side surface of the one of the internal electrodes other than a side surface connected to the external electrode and including a dielectric pattern having a porosity higher than that of one of the plurality of first dielectric layers.

According to an aspect of the present disclosure, a method of manufacturing a multilayer electronic component includes preparing a plurality of first ceramic green sheets on which a plurality of internal electrode patterns are respectively formed; forming a dielectric material at least partially in a region other than the internal electrode patterns with respect to the plurality of first ceramic green sheets; forming a laminate body by laminating the plurality of first ceramic green sheets such that adjacent internal electrodes of the internal electrode patterns intersect each other in a lamination direction in which the plurality of first ceramic green sheets are laminated, and laminating a second ceramic green sheet in the lamination direction on the plurality of first ceramic green sheets; and preparing a body including an active portion including a first dielectric layer made of one of the plurality of first ceramic green sheets, an internal electrode made of one of the internal electrode patterns, and a dielectric pattern made of the dielectric material, and a cover portion including a second dielectric layer made of the second ceramic green sheet, by baking the laminate body. The dielectric pattern has a porosity higher than that of the first dielectric layer.

According to an aspect of the present disclosure, a multilayer electronic component includes a body including first dielectric layers and internal electrodes alternately disposed, and a cover portion disposed on the active portion in a first direction of the body, a direction in which the first dielectric layers and the internal electrodes are laminated, the cover portion including a second dielectric layer; and an external electrode disposed externally on the body and connected to one of the internal electrodes. The body includes a margin portion covering a side surface of the one of the internal electrodes other than a side surface connected to the external electrode, the margin portion including a dielectric pattern. An average size of dielectric grains of one of the first dielectric layers disposed in a region overlapping the one of the internal electrodes in the active portion and an average size of dielectric grains disposed in the margin portion have a deviation of 50 nm or less therebetween.

According to an aspect of the present disclosure, a multilayer electronic component includes a body including first dielectric layers and internal electrodes alternately disposed, and a cover portion disposed on the active portion in a first direction of the body, a direction in which the first dielectric layers and the internal electrodes are laminated, the cover portion including a second dielectric layer; and an external electrode disposed externally on the body and connected to one of the internal electrodes. The body includes a margin portion covering a side surface of the one of the internal electrodes other than a side surface connected to the external electrode, the margin portion including a dielectric pattern.

A difference between an average size of dielectric grains of one of the first dielectric layers disposed in a region overlapping the one of the internal electrodes in the active portion and an average size of dielectric grains disposed in the margin portion, with respect to the average size of dielectric grains disposed in the margin portion, is 15.6% or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
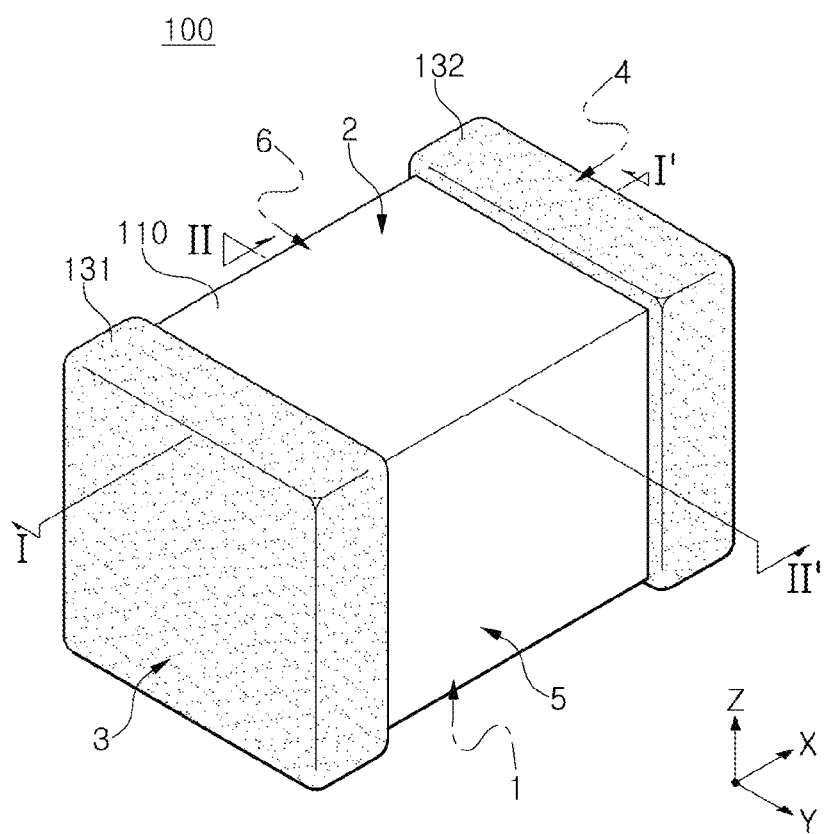
FIG. 1 is a perspective diagram illustrating a multilayer electronic component according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Shapes and sizes of elements in the drawings may be exaggerated for clarity of description, and elements indicated by the same reference numeral are same elements in the drawings.

Also, it will be understood that when a portion "includes" an element, it may further include another element, not excluding another element, unless otherwise indicated.

As for the directions to clearly describe an example embodiment, X, Y, and Z in the drawings represent a length direction, a width direction, and a thickness direction of a multilayer electronic component, respectively.

Also, in example embodiments, a length direction may be an X direction or a second direction, a width direction may be a Y direction or a third direction, and the thickness direction may be a Z direction or a first direction.

Multilayer Electronic Component

Figure 2:
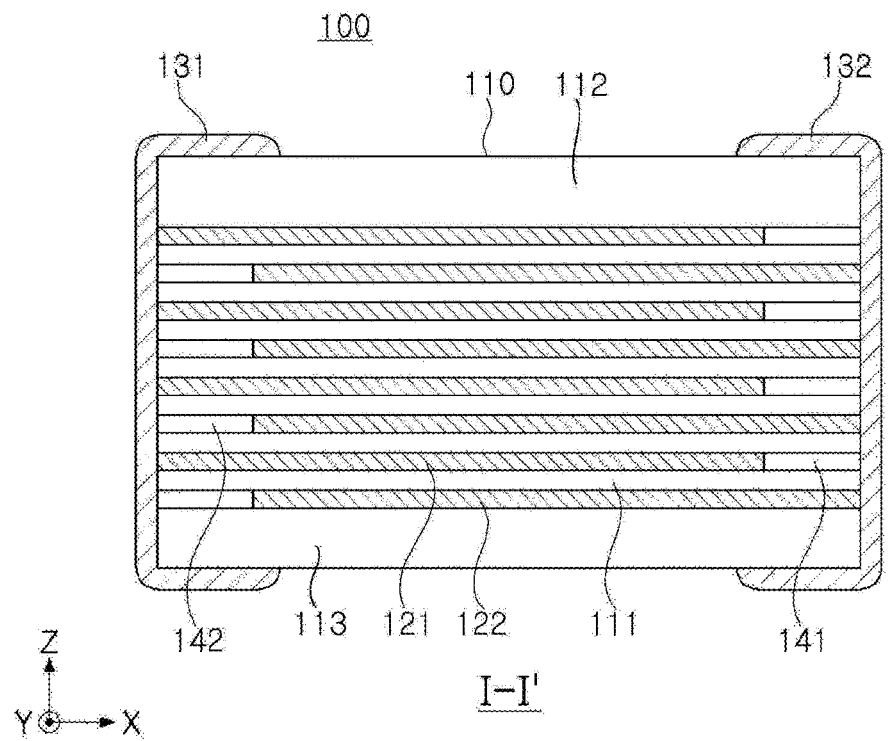
FIG. 2 is a cross-sectional diagram taken along line I-I' in FIG. 1.
Figure 3:
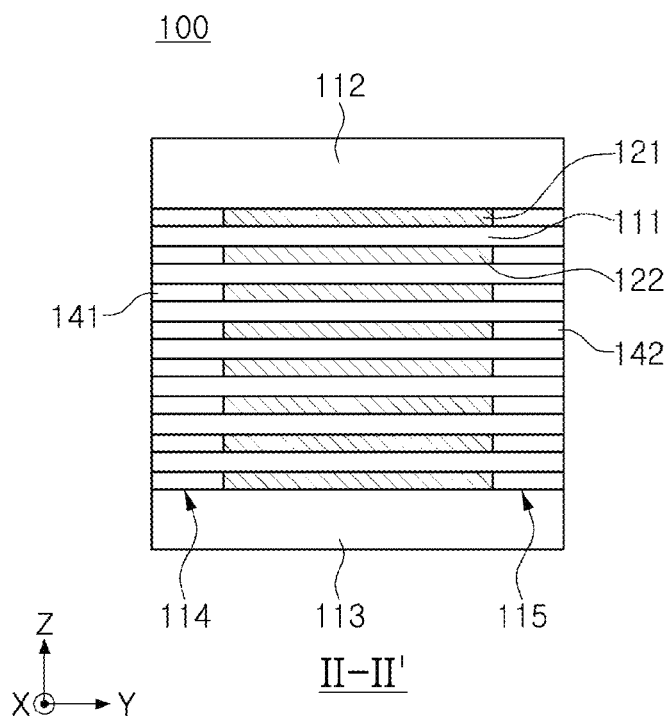
FIG. 3 is a cross-sectional diagram taken along line II-II' in FIG. 1.
Figure 4:
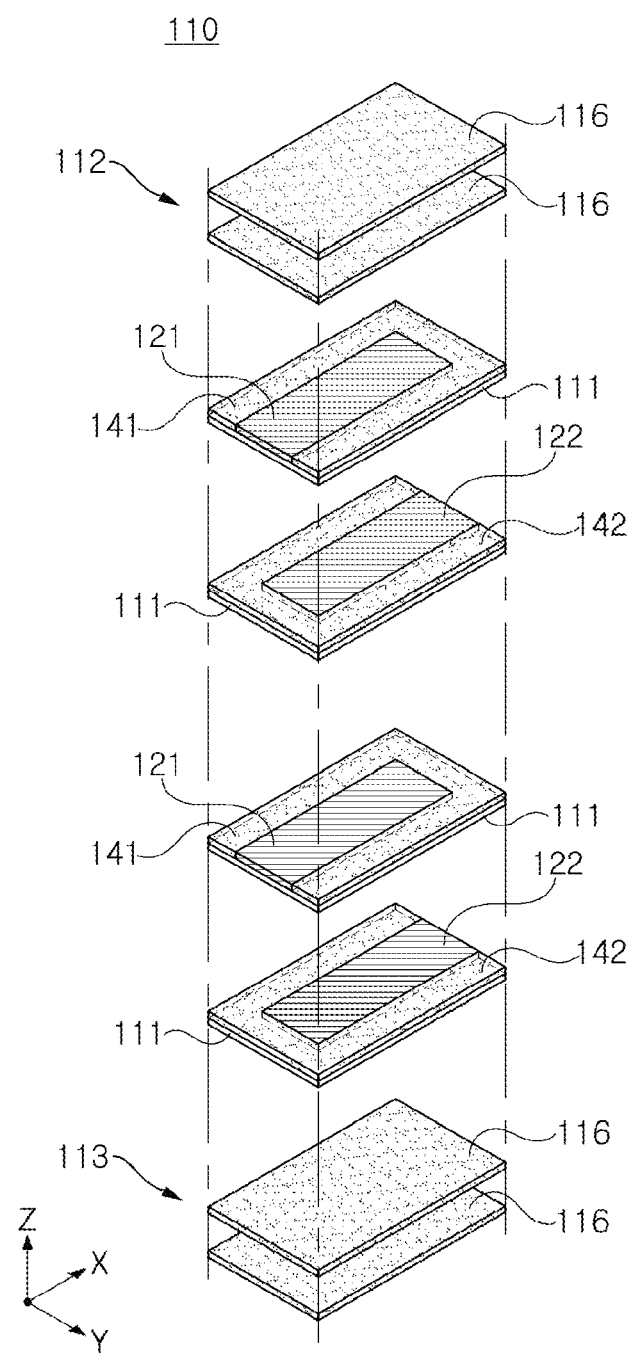
FIG. 4 is an exploded perspective diagram illustrating a body in which a dielectric layer and an internal electrode are laminated according to an example embodiment of the present disclosure.

FIG. 1 is a perspective diagram illustrating a multilayer electronic component according to an example embodiment. FIG. 2 is a cross-sectional diagram taken along line I-I' in FIG. 1. FIG. 3 is a cross-sectional diagram taken along line II-II' in FIG. 1. FIG. 4 is an exploded perspective diagram illustrating a body in which a dielectric layer and an internal electrode are laminated according to an example embodiment.

In the description below, a multilayer electronic component according to an example embodiment will be described with reference to FIGS. 1 to 4.

The multilayer electronic component 100 in an example embodiment may include a body 110 including a plurality of first dielectric layers 111, and a plurality of internal electrodes 121 and 122 disposed with the first dielectric layer 111 interposed therebetween, and external electrodes 131 and 132 disposed externally on the body 110 and connected to the internal electrodes 121 and 122.

A shape of the body 110 is not limited to any particular shape, and may have a hexahedral shape or a shape similar to a hexahedron as illustrated in the diagram. Due to reduction of ceramic powder included in the body 110 during a baking process, the body 110 may have a substantially hexahedral shape.

The body 110 may have first and second surfaces 1 and 2 opposing each other in the lamination direction (Z direction), third and fourth surfaces 3 and 4 connected to the first and second surfaces 1 and 2 and opposing each other in the length direction (X direction), and fifth and sixth surfaces 5 and 6 connected to the first to fourth surfaces 1, 2, 3, and 4 and opposing each other in the width direction (Y direction).

The body 110 may include an active portion in which the plurality of first dielectric layers 111 and the internal electrodes 121 and 122 are alternately disposed, and cover portions 112 and 113 disposed on both ends of the active portion in the first direction, the direction in which the first dielectric layers 111 are laminated, and including the second dielectric layer 116.

The active portion may contribute to formation of capacity of the capacitor, and may be formed by alternately disposing the plurality of internal electrodes 121 and 122 with the first dielectric layer 111 interposed therebetween.

The plurality of first dielectric layers 111 included in the active portion may be in a baked state, and boundaries between the adjacent first dielectric layers 111 may be integrated such that it may be difficult to identify the boundaries without using a scanning electron microscope (SEM).

A raw material for forming the first dielectric layer 111 is not limited to any particular material as long as sufficient capacitance may be obtained. For example, a barium titanate material, a lead composite perovskite material, a strontium titanate material, or the like, may be used.

Also, a material for forming the first dielectric layers 111 may further include various ceramic additives, organic solvents, binders, and dispersants in addition to powder such as barium titanate ($BaTiO_3$).

The cover portions 112 and 113 may include an upper cover portion 112 and a lower cover portion 113, and may prevent damage to the internal electrodes caused by physical or chemical stress. The cover portions 112 and 113 may not include the internal electrodes.

In the example embodiment, the cover portions 112 and 113 may be formed by laminating the second dielectric layers 116 above and below the active portion in the thickness direction.

The plurality of second dielectric layers 116 included in the cover portions 112 and 113 may be in a baked state, and boundaries between the second dielectric layers 116 adjacent to each other may be integrated such that it may be difficult to identify the boundaries without using a scanning electron microscope (SEM).

A raw material for forming the second dielectric layer 116 is not limited to any particular material as long as sufficient capacitance may be obtained. For example, a barium titanate material, a lead composite perovskite material, a strontium titanate material, or the like, may be used.

Also, a material for forming the second dielectric layers 116 may further include various ceramic additives, organic solvents, binders, and dispersants in addition to powder such as barium titanate ($BaTiO_3$).

The first dielectric layer 111 included in the active portion and the second dielectric layer 116 included in the cover portions 112 and 113 may have different dielectric compositions. For example, the first dielectric layer 111 and the second dielectric layer 116 may be formed of different types of ceramic materials, or may include subcomponents such as lithium (Li) and sodium (Na) in different compositions.

Alternatively, the first dielectric layer 111 included in the active portion and the second dielectric layer 116 included in the cover portions 112 and 113 may have the same dielectric composition. In this case, even though the dielectric compositions are the same, sizes of ceramic particles included in the first dielectric layer 111 and the second dielectric layer 116 may be different.

Alternatively, a porosity of the first dielectric layer 111 included in the active portion may be different from a porosity of the second dielectric layer 116 included in the cover portions 112 and 113. Accordingly, an average porosity of the first dielectric layer 111 and an average porosity of the cover portions 112 and 113, included in the active portion, may be different from each other in the final product.

The plurality of internal electrodes 121 and 122 may be alternately disposed with the plurality of first dielectric layers 111 interposed therebetween.

The external electrodes 131 and 132 may be formed on both end surfaces of the body 110 in the second direction (X direction), and the plurality of internal electrodes 121 and 122 may include the first and second internal electrodes 121 and 122 connected to the external electrodes 131 and 132, respectively.

The first and second internal electrodes 121 and 122 may be alternately disposed to oppose each other with the first dielectric layer 111 forming the active portion of the body 110 interposed therebetween, and may be exposed to the fourth surfaces 3 and 4 of the body 110, respectively.

Referring to FIGS. 1 to 3, the first internal electrode 121 may be spaced apart from the fourth, fifth and sixth surfaces 4, 5, and 6 and may be exposed through the third surface 3, and the second internal electrode 122 may be spaced apart from the third, fifth, and sixth surfaces 3, 5, and 6 and may be exposed through the fourth surface 4.

The first external electrode 131 may be disposed on the third surface 3 of the body 110 and may be connected to the first internal electrode 121, and the second external electrode 132 may be disposed on the fourth surface 4 of the body and may be connected to the second internal electrode 122.

In this case, the first external electrode 131 and the second internal electrode 122 may be spaced apart from each other in the second direction (X direction), the second external electrode 132 and the first internal electrode 121 may be spaced apart from each other in the second direction (X direction), and shortest spacings therebetween may be the same.

Referring to FIG. 4, the body 110 may be formed by alternately laminating the first dielectric layer 111 on which the first internal electrode 121 is printed and the first dielectric layer 111 on which the second internal electrode 122 is printed in the thickness direction (Z direction), and baking the dielectric layers.

In this case, the first and second internal electrodes 121 and 122 may be electrically separated from each other by the first dielectric layer 111 interposed therebetween.

A material for forming the first and second internal electrodes 121 and 122 is not limited to any particular material, and may be formed using a conductive paste formed of at least one of a noble metal material or nickel (Ni) and copper (Cu).

As a method of printing the conductive paste, a screen-printing method or a gravure printing method may be used, and an example embodiment thereof is not limited thereto.

A margin portion may be disposed on a side surface of the active portion of the body 110. The margin portion may prevent damages to the internal electrode caused by physical or chemical stress.

The margin portion may cover a side surface of the internal electrodes 121 and 122 other than a side surface connected to the external electrodes 131 and 132. In this case, the margin portion may be formed by forming the internal electrode by applying a conductive paste on a region of the ceramic green sheet other than a portion in which the margin portion is formed.

In the example embodiment, the internal electrodes 121 and 122 may include the first internal electrode 121 connected to the third surface 3 of the body 110 and spaced apart from the fourth, fifth and sixth surfaces 4, 5, and 6, and the second internal electrode 122 connected to the fourth surface 4 of the body 110 and spaced apart from the third, fifth and sixth surfaces 3, 5 and 6. The internal electrodes may be connected to the external electrodes 131 and 132 through the third and fourth surfaces 3 and 4, respectively.

Accordingly, in this case, the margin portion may be disposed to cover the side surface adjacent to the fourth, fifth and sixth sides 4, 5, and 6 surfaces of the body 110 and the side surface adjacent to the third, fifth and sixth surfaces 3, 5, and 6 in the internal electrodes 121 and 122.

Also, referring to FIG. 3, the margin portion may include the margin portion 114 disposed on the sixth surface 6 of the body 110 and the margin portion 115 disposed on the fifth surface 5. Thus, the margin portion may include the margin portions 114 and 115 disposed on both side surfaces of the ceramic body 110 in the width direction.

Referring to FIGS. 2 to 4, the margin portion may include dielectric patterns 141 and 142. In other words, the internal electrodes 121 and 122 are disposed on the plurality of first dielectric layers 111, respectively, and the margin portion may be formed in a region in which the internal electrodes 121 and 122 are not disposed, and the dielectric patterns 141 and 142 may be disposed in the margin portions, respectively.

As illustrated in FIG. 2, the dielectric patterns 141 and 142 may be disposed to fill a tolerance formed between the first dielectric layers 111 as the first and second internal electrodes 121 and 122 are alternately disposed, such that the dielectric patterns 141 and 142 may prevent cracks of or damages to the multilayer electronic component 100.

Also, the dielectric patterns 141 and 142 may be disposed to fill a tolerance formed on the marginal portions 114 and 115 on both ends in the third direction (Y direction) in the active portion of the body 110 as illustrated in FIG. 3, and accordingly, breakage caused by non-uniform reduction or expansion between the active portion and the margin portion in sintering the multilayer electronic component 100 may be prevented.

The dielectric patterns 141 and 142 may include the first dielectric pattern 141 spaced apart from the fourth, fifth and sixth surfaces 4, 5, and 6 of the body 110 and disposed around the first internal electrode 121, and the second dielectric pattern 142 spaced apart from the third, fifth and sixth surfaces 3, 5, and 6 of the body 110 and disposed around the second internal electrode 122.

As illustrated in FIG. 4, the first dielectric pattern 141 may be disposed to fill a region of the first dielectric layer 111 in which the first internal electrode 121 is not formed, and the second dielectric pattern 142 may be disposed to fill a region of the first dielectric layer 111 in which the second internal electrode 122 is not formed.

The dielectric patterns 141 and 142 may be formed of a dielectric material. The dielectric material for forming the dielectric patterns 141 and 142 is not limited to any particular material as long as sufficient capacitance may be obtained. For example, a barium titanate material, a lead composite perovskite material, a strontium titanate material, or the like, may be used.

Also, the material for forming the dielectric patterns 141 and 142 may further include various ceramic additives, organic solvents, binders, and dispersants in addition to powder such as barium titanate ($BaTiO_3$).

In this case, the dielectric patterns 141 and 142 and the first dielectric layer 111 may have different porosities. A porosity of the dielectric patterns 141 and 142 may be higher than a porosity of the first dielectric layer 111.

A porosity of the dielectric patterns 141 and 142 and a porosity of the first dielectric layer 111 may be varied according to a difference in content of a binder included in each of the dielectric material and the ceramic green sheet applied in the process of forming the dielectric patterns 141 and 142 and the first dielectric layer 111. In other words, since a greater amount of binder is included in the dielectric material for forming the dielectric patterns 141 and 142, the dielectric patterns 141 and 142 may have a relatively high porosity, and the first dielectric layer 111 may have a relatively low porosity.

In the multilayer electronic component 100 in the example embodiment, a greater amount of binder may be included in the dielectric material for forming the dielectric patterns 141 and 142, such that the dielectric patterns 141 and 142 may have a reduction rate higher than that of the dielectric layer 111.

Specifically, in the technical field to which the present disclosure belongs, the reduction rate of the internal electrode may be generally lower than that of the dielectric layer, such that a deviation in the reduction rate may occur in the process of sintering the electronic component. Accordingly, deformation such as reverse connection may occur in the electronic component due to non-uniform reduction, which may be a factor deteriorating reliability.

Accordingly, the dielectric patterns 141 and 142 in the example embodiment may have a reduction rate corresponding to a value between the reduction rate of the first dielectric layer 111 and the reduction rate of the internal electrodes 121 and 122, such that degradation in reliability of the first dielectric layer 111 and the internal electrodes 121 and 122 caused by the deviation in the reduction rate may be prevented.

The first dielectric layer 111 and the dielectric patterns 141 and 142 included in the active portion may have different dielectric compositions. For example, the first dielectric layer 111 and the dielectric patterns 141 and 142 may be formed of different types of ceramic materials, or may include subcomponents such as lithium (Li) and sodium (Na) in different compositions.

Alternatively, the first dielectric layer 111 and the dielectric patterns 141 and 142 may have the same dielectric composition other than the content of the binder before sintering. In this case, although the dielectric compositions are the same, the sizes of ceramic particles included in the first dielectric layer 111 and the dielectric patterns 141 and 142 may be different.

In an example embodiment, the dielectric composition of the dielectric patterns 141 and 142 and the dielectric composition of the second dielectric layer 116 may be the same. The dielectric patterns 141 and 142 formed in the margin portions and the cover portions 112 and 113 of the body 110 formed by the second dielectric layer 116 may have the same dielectric composition.

In this case, the dielectric patterns 141 and 142 and the second dielectric layer 116 may have the same average porosity. In other words, the content of a binder included in the dielectric material forming the dielectric patterns 141 and 142 and the ceramic green sheet forming the second dielectric layer 116 may be the same. Accordingly, the reduction rates of the dielectric patterns 141 and 142 and the second dielectric layer 116 may be almost the same during sintering.

In the multilayer electronic component 100 in the example embodiment, by configuring the reduction rates of the dielectric patterns 141 and 142 and the cover portions 112 and 113 to be the same as described above, the cover portions 112 and 113 may be configured to have the reduction rate similar to an average reduction rate of the active portion. In other words, by configuring the cover portions 112 and 113 to have a reduction rate similar to the average value of the reduction rate of the first dielectric layer 111, the internal electrodes 121 and 122, and the dielectric patterns 141 and 142, included in the active portion, a deviation in reduction rates between the active portion and the cover portions 112 and 113 may be reduced.

Accordingly, separation of and damage to the body 110 caused by a deviation in reduction rate between the active portion and the cover portions 112 and 113 may be prevented in sintering the multilayer electronic component 100.

The external electrodes 131 and 132 may be disposed on the body 110 and may be connected to the internal electrodes 121 and 122.

As illustrated in FIGS. 1 to 3, the external electrodes 131 and 132 may include first and second external electrodes 131 and 132 disposed on the third and fourth surfaces 3 and 4 of the body 110, respectively, and connected to the first and second internal electrodes 121 and 122, respectively.

In the example embodiment, a structure in which the multilayer electronic component 100 has two external electrodes 131 and 132 is described, but the number or the shape of the external electrodes 131 and 132 may be varied depending on the shape of the internal electrodes 121 and 122 and other purposes.

The external electrodes 131 and 132 may be formed using various materials having electrical conductivity such as metal, and a specific material may be determined in consideration of electrical properties and structural stability.

For example, the external electrodes 131 and 132 may be baked electrodes including conductive metal and glass, or resin electrodes including conductive metal and resin.

Also, the external electrodes 131 and 132 may have a shape in which a baked electrode and a resin electrode are formed in order on the body 110. Also, the external electrodes 131 and 132 may be formed by transferring a sheet including a conductive metal to the body 110 or by transferring a sheet including a conductive metal to the sintered electrode.

A material having excellent electrical conductivity may be used as the conductive metal included in the external electrodes 131 and 132, and the material is not limited to any particular material. For example, the conductive metal may be one or more of nickel (Ni), copper (Cu), and alloys thereof.

Also, the first and second external electrodes 131 and 132 may further include a plating layer. The plating layer may include first and second nickel (Ni) plating layers, and first and second tin (Sn) plating layers covering the first and second nickel plating layers, respectively.

Figure 5:
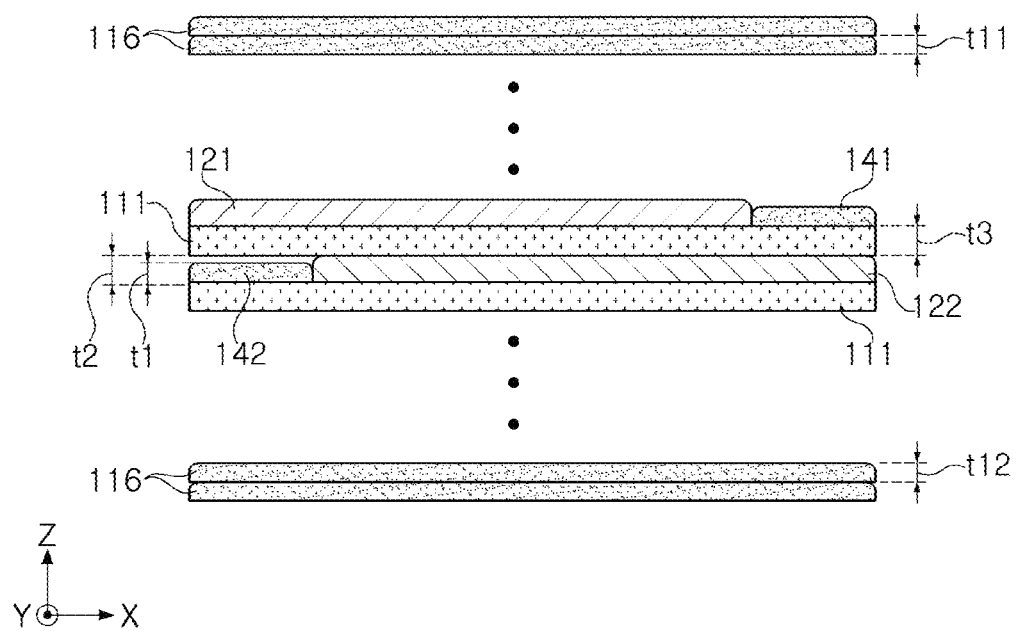
FIG. 5 is a plan diagram illustrating a modified example of the body in FIG. 4 on an X-Z plane.

FIG. 5 is a plan diagram illustrating a modified example of the body in FIG. 4 on an X-Z plane.

Referring to FIG. 5, a body 110-1 according to the modified example may include dielectric patterns 141 and 142 having a limited height.

In the body 110-1 in the modified example, the first dielectric layer 111 and the internal electrodes 121 and 122 may be alternately disposed to form an active portion, similarly to the body 110 illustrated in FIG. 4. Also, the second dielectric layers 116 may be laminated on both ends in the lamination direction (first direction) to form the cover portions 112 and 113.

The dielectric patterns 141 and 142 may have a filling rate of 30% to 90% with respect to the margin portion. For example, when an average height of the dielectric patterns 141 and 142 in the first direction is defined as t1, and an average height of the internal electrodes 121 and 122 in the first direction is defined as t2, t1 may satisfy $0.3t2 \le t1 \le 0.9t2$.

The dielectric patterns 141 and 142 may be formed to have the same height as that of the internal electrodes 121 and 122, and in this case, reverse connection or disconnection may occur due to reduction or expansion in sintering the multilayer electronic component. Therefore, preferably, the dielectric patterns 141 and 142 may be formed to have a height of 90% or less of the entire height of the margin portion in the first direction. In other words, an average height t1 of the dielectric patterns 141 and 142 in the first direction may satisfy $t1 \le 0.9t2$.

When the dielectric patterns 141 and 142 are formed to have a reduced height, the filling rate of the margin portion may be low, such that the effect of filling the tolerance formed between the first dielectric layers 111 may not be properly obtained. Accordingly, non-uniform deformation such as reverse connection of the multilayer electronic component 100 may not be effectively prevented. When the filling rate of the margin portion has a low value, less than 30%, withstand voltage properties (BDV) of the multilayer electronic component 100 may not reach a required value.

Thus, the dielectric patterns 141 and 142 may be formed to have a height of 30% or more of the entire height of the margin portion in the first direction. Accordingly, the average height t1 of the dielectric patterns 141 and 142 in the first direction may satisfy $0.3t2 \le t1$.

The average heights t11 and t12 of the second dielectric layer 116 forming the cover portion in the first direction are not limited to any particular example. As an example, as illustrated in FIG. 5, the average heights t11 and t12 of the second dielectric layer 116 in the first direction may be the same as the average height t1 of the dielectric patterns 141 and 142 in the first direction.

Also, the average height t3 of the first dielectric layer 111 in the first direction is not limited to any particular example. As an example, as illustrated in FIG. 5, the average height t3 of the first dielectric layer 111 in the first direction may be greater than the average height t1 of the dielectric patterns 141 and 142 in the first direction. Also, the average height t3 of the first dielectric layer 111 in the first direction may be the same as the average height t2 of the internal electrodes 121 and 122 in the first direction.

However, since the above configuration is only an example, the heights of the dielectric layers 111 and 116 in the first direction may be varied if desired.

An average height of each element is an average value of the heights of the elements in the first direction from a plurality of cross-sectional surfaces (e.g., ten cross-sectional surfaces with the same spacing) of the multilayer electronic component in parallel to an X-Z plane or a Y-Z plane. In another example, an average height of each element is an average value of the heights of the element in the first direction measured at locations with the same spacing in the X direction of a cross-sectional surface of the multilayer electronic component in parallel to an X-Z plane, or is an average value of the heights of the element measured at locations with the same spacing at locations at the same spacing in the Y direction of a cross-sectional surface of the multilayer electronic component in parallel to a Y-Z plane. The measurement may be performed by an optical microscope or a scanning electron microscope (SEM), although the present disclosure is not limited thereto. Other parameters may be measured in a similar manner. Other methods and/or tools appreciated by one of ordinary skill in the art, even if not described in the present disclosure, may also be used.

Accordingly, the heights of the elements in the first direction with respect to the different cross-sectional surfaces thereof may be different. In other words, the dielectric patterns 141 and 142, the first dielectric layers 111, the second dielectric layers 116, and the internal electrodes 121 and 122 may not have a constant height, and may be formed in a shape protruding or being recessed in partial regions.

In the description below, a method of manufacturing a multilayer electronic component 100 in an example embodiment will be described.

A plurality of first ceramic green sheets may be prepared.

The first ceramic green sheet may be provided to form the first dielectric layer 111 of the body 110, and may be formed by forming slurry by mixing ceramic powder, a polymer, and a solvent and forming the slurry in a sheet shape through method such as a doctor blade method.

The ceramic powder included in the slurry forming the first dielectric layer may include $BaTiO_3$ as a main component.

Thereafter, internal electrodes 121 and 122 may be formed by printing a conductive paste for internal electrodes on at least one surface of each of the first ceramic green sheets. The conductive paste for internal electrodes may be formed by mixing Ni powder and Cu powder or including Ni—Cu alloy powder, for example.

As the method of printing the conductive paste for internal electrodes, a screen printing method or a gravure printing method may be used.

When a first internal electrode pattern or a second internal electrode pattern is formed on the plurality of first ceramic green sheets, a dielectric material may be arranged in at least a portion of a region other than the first and second internal electrode patterns with respect to each of the plurality of first ceramic green sheets.

The dielectric material may correspond to a material forming the dielectric patterns 141 and 142, and the dielectric patterns 141 and 142 may have a porosity higher than that of the first dielectric layer 111.

Also, in this case, when a volume fraction of a binder included in the first ceramic green sheet is A, a volume fraction of a binder included in the first and second internal electrode patterns is B, and a volume fraction of a binder included in the dielectric material is defined as C, A, B, and C may satisfy A>C≥B. In other words, a content of the binder of the dielectric material forming the dielectric patterns 141 and 142 may correspond to a value between the contents of the binders included in the first ceramic green sheet and the internal electrode pattern, or may be equal to the content of the binder of the internal electrode pattern.

Accordingly, the reduction rate in sintering of the dielectric patterns 141 and 142 may correspond to a value between the reduction rates of the first dielectric layer 111 and the internal electrodes 121 and 122, or may be almost the same as the reduction rate of the internal electrodes 121 and 122. Accordingly, a porosity of the dielectric patterns 141 and 142 included in the margin portion may be higher than a porosity of the first dielectric layer 111 included in the active portion.

Referring to FIG. 4, the plurality of first ceramic green sheets may be alternately laminated such that the first internal electrode pattern and the second internal electrode pattern may intersect, and the plurality of first ceramic green sheets may be pressured in the lamination direction, such that the plurality of laminated first ceramic green sheets and the internal electrodes formed on the first ceramic green sheets may be compressed, thereby forming a laminate body.

Also, the cover portions 112 and 113 may be formed by laminating at least one or more second ceramic green sheets above and below the laminate body. The cover portions 112 and 113 may have the same composition as that of the first dielectric layer 111 disposed in the laminate body, and may be different from the first dielectric layer 111 in that the cover portions 112 and 113 do not include the internal electrodes.

In this case, the second ceramic green sheet may form a second dielectric layer 116, and a dielectric composition of the second ceramic green sheet may be the same as the composition of the dielectric material forming the dielectric patterns 141 and 142.

The first ceramic green sheet and the second ceramic green sheet may include different contents of binders. Accordingly, a porosity of the first dielectric layer 111 included in the active portion may be different from a porosity of the cover portions 112 and 113.

Thereafter, the laminate body may be cut into chips for each region corresponding to a single capacitor, and may be baked at a high temperature, such that the body 110 including the active portion including the first dielectric layer 111, the internal electrodes 121 and 122, and the dielectric patterns 141 and 142 and the cover portions 112 and 113 including the second dielectric layer 116 may be manufactured.

The first and second internal electrodes 121 and 122 may be formed to be electrically connected to the first and second internal electrodes 121 and 122 by covering the exposed portions of the first and second internal electrodes 121 and 122, exposed to both side surfaces of the body 110.

In this case, surfaces of the first and second external electrodes 131 and 132 may be plated with nickel (Ni) or tin (Sn), if desired.

Figure 6A:
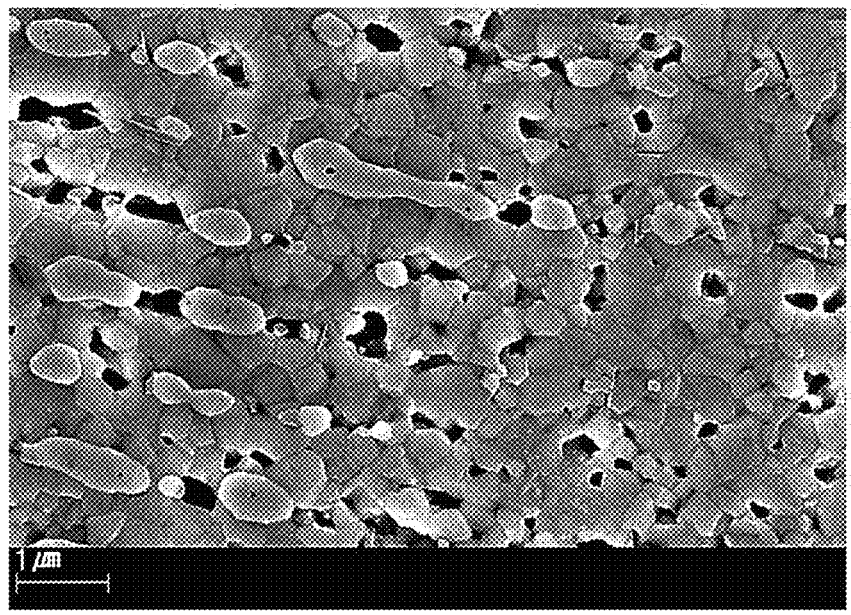
FIGS. 6A and 6B are images of a boundary between an active portion and a margin portion of a multilayer electronic component according to an example embodiment of the present disclosure.
Figure 6B:
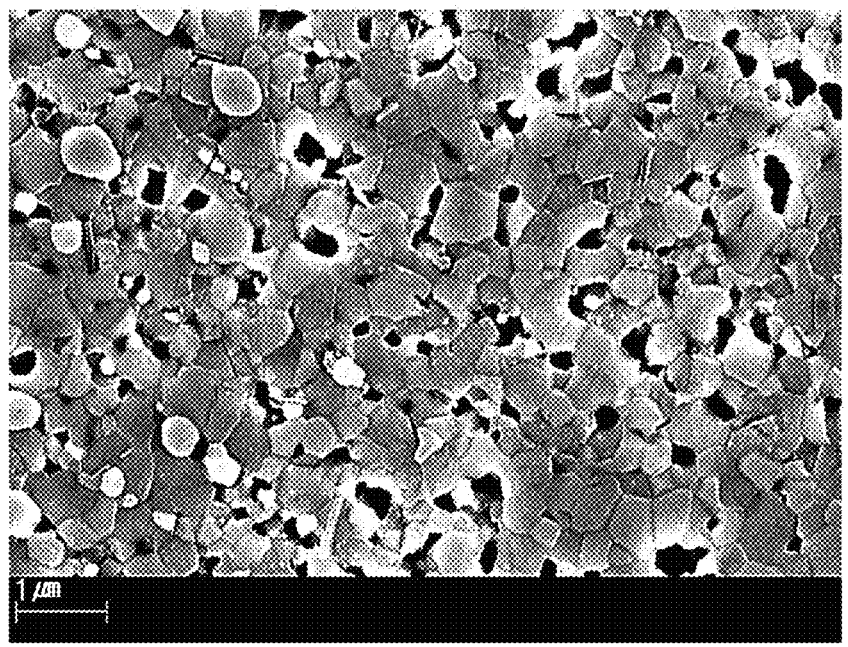
Figure 7A:
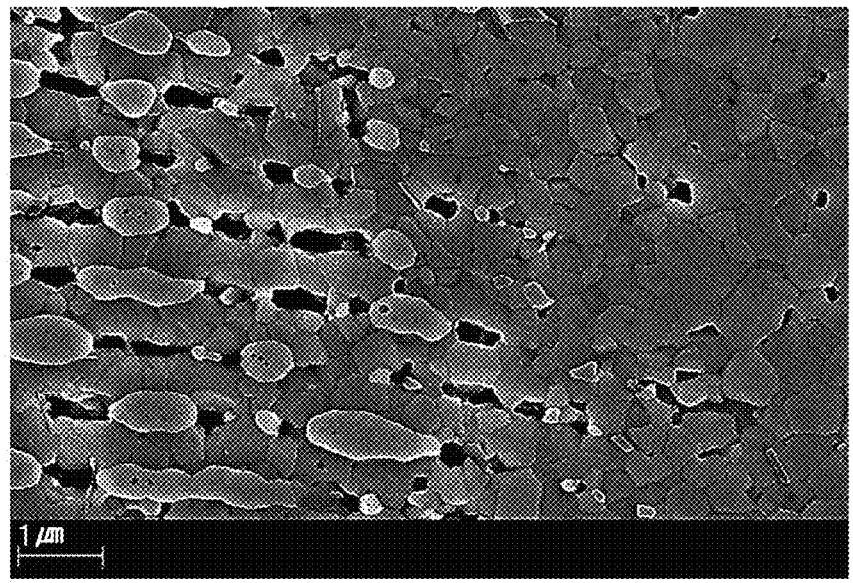
FIGS. 7A and 7B are images of a boundary between an active portion and a margin portion of a general multilayer electronic component.
Figure 7B:
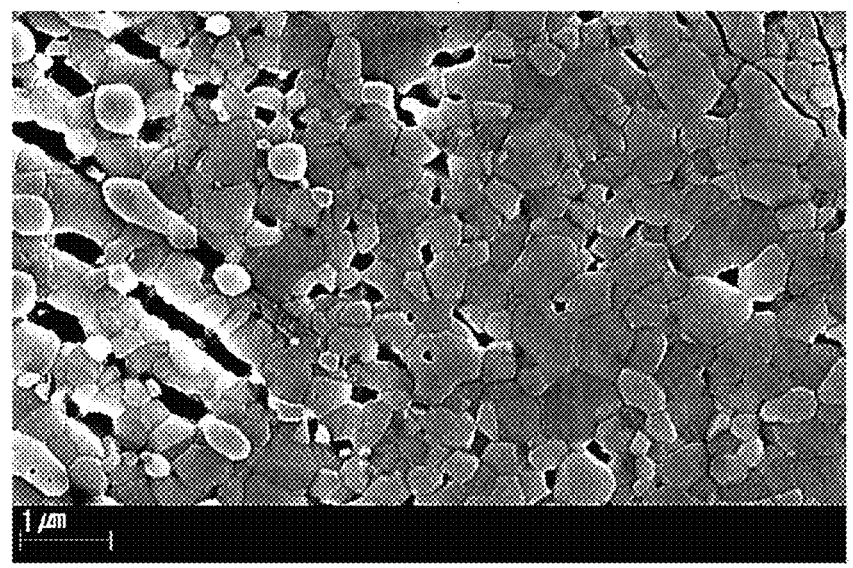

FIGS. 6A and 6B are images of a boundary between an active portion and a margin portion of a multilayer electronic component according to an example embodiment. FIGS. 7A and 7B are images of a boundary between an active portion and a margin portion of a general multilayer electronic component.

In each of the images in FIGS. 6A to 7B, the left side is an active portion including an internal electrode, and the right side is a margin portion without an internal electrode. Also, the intermediate side is the end of the internal electrode, the boundary between the active portion and the margin portion.

Referring to FIGS. 6A to 7B, differently from the general multilayer electronic component illustrated in FIGS. 7A and 7B, a greater number of pores were observed in the image of the multilayer electronic component in the example embodiment illustrated in FIGS. 6A and 6B. Also, in FIGS. 6A and 6B, a greater number of pores were observed in the margin portion on the right side than in the active portion on the left side.

Presumably, the porosity appeared as above because a large amount of binder was included in the dielectric material forming the dielectric patterns 141 and 142 included in the margin portion in the forming the body 110 in the example embodiment. In other words, it may be deemed that the dielectric patterns 141 and 142 of the margin portion and the first dielectric layer 111 of the active portion may have different porosities depending on the content of binders included in the dielectric material and the ceramic green sheet applied in the process of forming the dielectric patterns 141 and 142 of the margin portion and the first dielectric layer 111 of the active portion. A greater amount of binder may be included in the dielectric material forming the dielectric patterns 141 and 142, such that the dielectric patterns 141 and 142 may have a relatively high porosity, and the first dielectric layer 111 may have a relatively low porosity.

The multilayer electronic component 100 in the example embodiment may include a greater amount of binder in the dielectric material forming the dielectric patterns 141 and 142, such that the dielectric patterns 141 and 142 may be configured to have a reduction rate higher than that of the dielectric layer 111. Also, by reducing the deviation in the reduction rate occurring in the sintering the electronic component, reliability of the multilayer electronic component 100 may be secured.

Table 1 below lists the reduction rates depending on the content of binder of the material for forming each element when the multilayer electronic component 100 in an example embodiment illustrated in FIG. 6 is manufactured.

The reduction rates in Table 1 were obtained by calculating a value of a theoretical linear reduction rate. In the example embodiment, the theoretical linear reduction rate may refer to a reduction rate of when an object having a porosity a is isotropic-reduced in the X, Y, and Z directions and reaches full densification. Therefore, the theoretical linear reduction rate may refer to a linear reduction in one of the X, Y, and Z directions.

Based on the above definition, the theoretical linear reduction rate of each material in the experimental example in Table 1 was calculated using the formula as below.

When the porosity of each material is a, the theoretical linear reduction rate (S_linear) (%) of the material is calculated as S_linear={1−(1−a)$^{(1/3)}$}*100.

A content of the binder included in the first dielectric layer represents a ratio of a volume of the binder to an entire volume of the first ceramic green sheet forming the first dielectric layer including the ceramic material such as $BaTiO_3$ before sintering. Also, the content of the binder included in the internal electrode represents a ratio of a volume of the binder to an entire volume of the internal electrode paste forming the internal electrode pattern including a conductive metal such as Ni before sintering. Also, the content of the binder included in the second dielectric layer represents a ratio of a volume of the binder to an entire volume of the second ceramic green sheet forming the second dielectric layer including a ceramic material such as $BaTiO_3$ before sintering. Also, the content of the binder included in the dielectric pattern represents a ratio of a volume of the binder to an entire volume of the dielectric material forming the dielectric pattern including ceramic material such as $BaTiO_3$ before sintering.

TABLE 1

| | Content of binder (%) | Theoretical linear reduction rate (%) |
|---|---|---|
| First dielectric layer | 62.5 | 27.9 |
| Internal electrode | 46.8 | 19.0 |
| Second dielectric layer | 53.2 | 22.3 |
| Dielectric pattern | 50.8 | 21.1 |

Referring to Table 1, it is indicated that the higher the content of the binder in each component, the higher the theoretical linear reduction rate. Also, in the multilayer electronic component 100 in an example embodiment in relation to Table 1, the content of the binder of the dielectric patterns 141 and 142 was determined to be a value between the contents of the binders of the first dielectric layer 111 and the internal electrodes 121 and 122, thereby reducing the deviation in reduction rate between the first dielectric layer 111 and the internal electrodes 121 and 122. Accordingly, the deviation in reduction rate between the active portion and the margin portion was decreased, and degradation of reliability caused by deformation or reverse connection of the multilayer electronic component 100 may be prevented.

Also, when the content of the binder included in the first dielectric layer 111 is the same as that of the internal electrodes 121 and 122, the reduction rates of the first dielectric layer 111 and the internal electrodes 121 and 122 may be almost the same, such that the same effect as in the above experimental example may be obtained.

Accordingly, in the example embodiment, the volume fraction of the binder included in the first ceramic green sheet is defined as A, the volume fraction of the binder included in the internal electrode pattern is defined as B, and the volume fraction of the binder included in the dielectric material is defined as C, A, B, and C may satisfy A>C≥B.

Also, in the multilayer electronic component 100 in the example embodiment in relation to Table 1, since the content of the binder of the second dielectric layer 116 forming the cover portions 112 and 113 may be determined to be a value between the contents of the binders of the first dielectric layer 111 and the internal electrodes 121 and 122, the deviation in reduction rates between the active portion and the cover portions 112 and 113 may be reduced. Accordingly, separation of and damages to the cover portions 112 and 113 caused by non-uniform deformation of the multilayer electronic component 100 may be prevented.

Referring to FIGS. 6A to 7B, in the multilayer electronic component 100 in an example embodiment illustrated in FIGS. 6A and 6B, a deviation between an average size of dielectric grains included in the active portion and an average size of dielectric grains included in the margin portion may be relative low. Differently from the example embodiment, in the general multilayer electronic component illustrated in FIGS. 7A and 7B, a deviation between an average size of dielectric grains included in the active portion and an average size of dielectric grains included in the margin portion may be relative high. In one example, the average size of dielectric grains may be determined within a region selected by one of ordinary skill in the art and calculated by averaging the measured sizes of the dielectric grains within the selected region. The measurement may be performed by an optical microscope or a scanning electron microscope (SEM), although the present disclosure is not limited thereto. Other methods and/or tools appreciated by one of ordinary skill in the art, even if not described in the present disclosure, may also be used.

Specifically, according to the result of measuring the average size of dielectric grains from each image, the average size of the dielectric grains of the dielectric layer included in the active portion in FIG. 7A was 0.28 µm, and the average size of the dielectric grains disposed in the margin portion was 0.42 µm. Also, in FIG. 7B, the average size of the dielectric grains of the dielectric layer included in the active portion was 0.32 µm, and the average size of the dielectric grains disposed in the margin portion was 0.42 µm.

Thus, in the general multilayer electronic component, the average size of the dielectric layer included in the active portion and the dielectric grains of the margin portion were different from each other by 100 nm to 140 nm.

Differently from the above example embodiment, in FIG. 6A, the average size of dielectric grains of the first dielectric layer included in the active portion was 0.27 µm, and the average size of the dielectric grains disposed in the margin portion was 0.32 µm. Also, in FIG. 6B, the average size of dielectric grains of the first dielectric layer included in the active portion was 0.31 µm, and the average size of the dielectric grains disposed in the margin portion was 0.32 µm. In one example, a difference between the average size of the dielectric grains disposed in the margin portion and the average size of dielectric grains of the first dielectric layer included in the active portion, with respect to the average size of the dielectric grains disposed in the margin portion, may be 15.6% or less.

Thus, in an example embodiment, the average size of the dielectric grains of the first dielectric layer 111 disposed in the region overlapping the internal electrodes 121 and 122 in the active portion and the average size of the dielectric grains disposed in the margin portion may have a deviation of 50 nm or less therebetween.

As described above, as a deviation between the average size of the dielectric grains of the first dielectric layer 111 disposed in the region overlapping the internal electrodes 121 and 122 in the active portion and the average size of the dielectric grains disposed in the margin portion was relatively low, a leakage current may be prevented from occurring on the ends of the internal electrodes 121 and 122.

Figure 8:
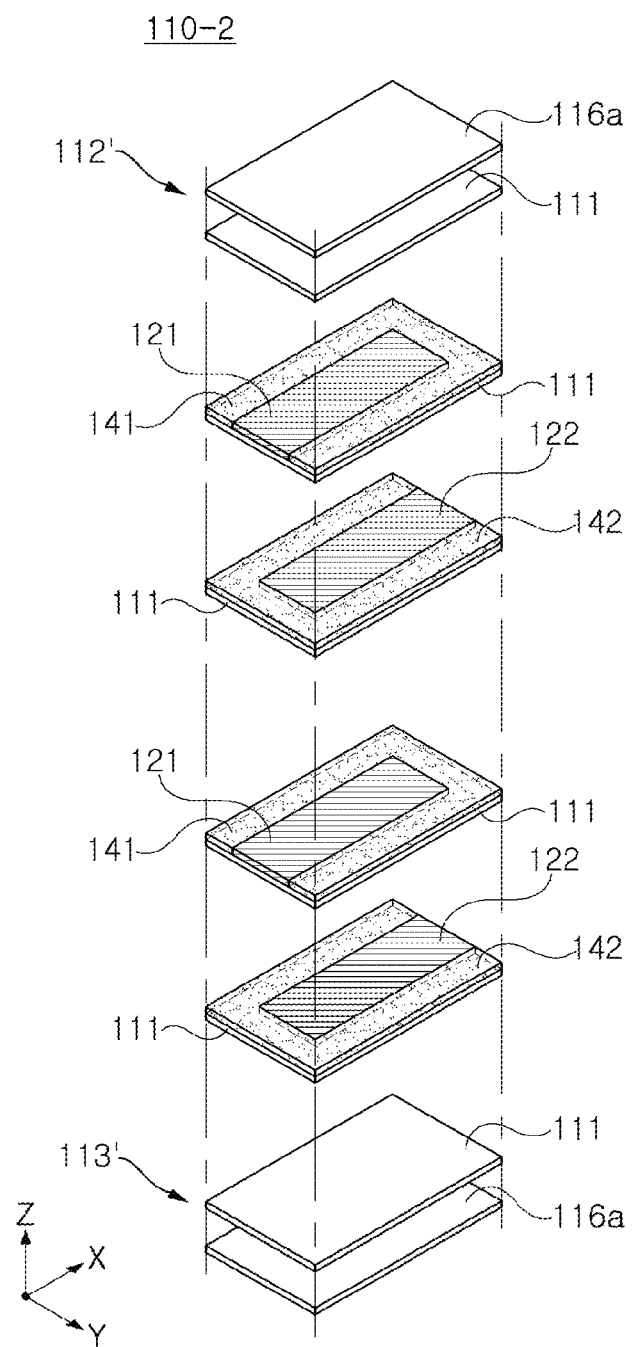
FIG. 8 is an exploded perspective diagram illustrating a body in which a dielectric layer and an internal electrode are laminated according to an example embodiment of the present disclosure.

FIG. 8 is an exploded perspective diagram illustrating a body in which a dielectric layer and an internal electrode are laminated according to an example embodiment.

A body 110-2 in the example embodiment may include an active portion including a plurality of first dielectric layers 111, and a plurality of internal electrodes 121 and 122 alternately disposed with the first dielectric layer 111 interposed therebetween, and cover portions 112' and 113' disposed on both ends in the lamination direction.

In this case, dielectric patterns 141 and 142 may be formed on the first dielectric layers 111 on which the first and second internal electrodes 121 and 122 are disposed, respectively.

Referring to FIG. 8, the cover portions 112' and 113' in the example embodiment may be formed by alternately disposing the first dielectric layer 111 and the second dielectric layer 116a. For example, the cover portions 112' and 113' may be formed by alternately laminating the first dielectric layer 111 and the second dielectric layer 116a, or may be formed by coating the first dielectric layers 111 with the second dielectric layer 116a and laminating the dielectric layers.

The first dielectric layer 111 may be the same as the first dielectric layer 111 included in the active portion in which the internal electrodes 121 and 122 are formed.

The second dielectric layer 116a included in the cover portions 112' and 113' in the example embodiment may have the same dielectric composition as that of the dielectric patterns 141 and 142 as described above, or may have a different dielectric composition. Also, the second dielectric layer 116a and the dielectric patterns 141 and 142 may have the same porosity or different porosities.

In this case, the second dielectric layer 116a may have a porosity or a reduction rate the same as those of the internal electrodes 121 and 122, such that the second dielectric layer 116a may have properties the same as those of a portion of the internal electrodes 121 and 122 or the entire internal electrodes 121 and 122.

In the example embodiment illustrated in FIG. 8, differently from the example embodiment illustrated in FIG. 4, different first and second dielectric layers 111 and 116a may be alternately laminated. Accordingly, as the cover portions 112 and 113 and the active portion include first dielectric layer 111 in common, the deviation in the average size of dielectric grains may be reduced. Also, the deviation in reduction rate between the cover portions 112 and 113 and the active portion may also be reduced.

Figure 9:
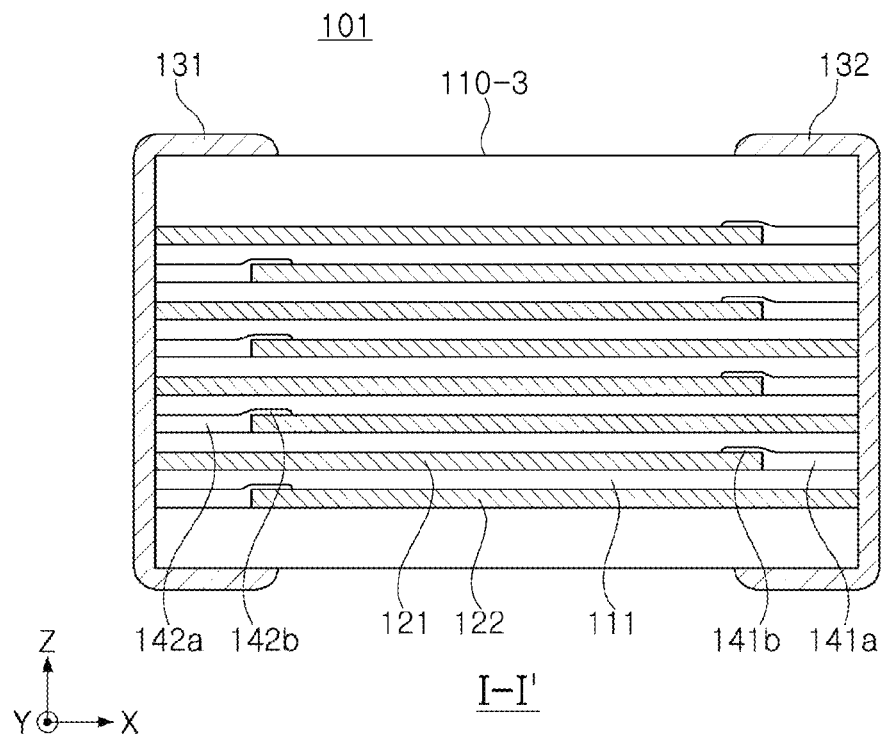
FIG. 9 is a cross-sectional diagram illustrating a modified example of a multilayer electronic component in FIG. 2 taken along line I-I'.
Figure 10:
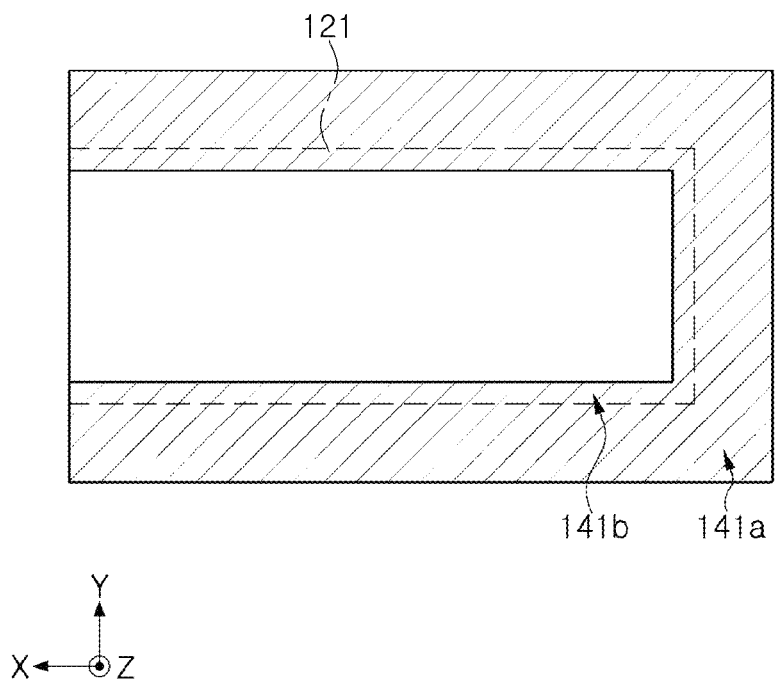
FIG. 10 is a plan diagram illustrating a first internal electrode in FIG. 9 on an X-Y plane.

FIG. 9 is a cross-sectional diagram illustrating a modified example of a multilayer electronic component in FIG. 2 taken along line I-I'. FIG. 10 is a plan diagram illustrating a first internal electrode in FIG. 9 on an X-Z plane.

Referring to FIGS. 9 and 10, a multilayer electronic component 101 in the modified example may include a body 110-3 including a plurality of first dielectric layers 111, and a plurality of internal electrodes 121 and 122 alternately disposed with the first dielectric layer 111 interposed therebetween, and external electrodes 131 and 132 disposed externally on the body 110-3 and connected to the internal electrodes 121 and 122.

Dielectric patterns 141a, 141b, 142a, and 142b may be formed in a margin portion in which the plurality of internal electrodes 121 and 122 are not formed. The dielectric patterns 141a, 141b, 142a, and 142b in the modified example may include the first dielectric patterns 141a and 141b formed on the same layer on which the first internal electrode 121 is formed, and the second dielectric patterns 142a and 142b formed on the same layer on which the second internal electrode 122 is formed.

As illustrated in FIG. 10, the first dielectric patterns 141a and 141b may include a peripheral portion 141a which does not overlap the first internal electrode 121 and an overlap portion overlapping the first internal electrode 121. Accordingly, at least a partial region of the first dielectric patterns 141a and 141b may overlap the first internal electrode 121 in the lamination direction (first direction).

Similarly, the second dielectric patterns 142a and 142b may include a peripheral portion 142a which does not overlap the second internal electrode 122 and an overlap portion 142b overlapping the second internal electrode 122. Accordingly, at least a partial region of the second dielectric patterns 142a and 142b may overlap the second internal electrode 122 in the lamination direction (first direction).

As described above, since the dielectric patterns 141a, 141b, 142a, and 142b in the modified example overlap the internal electrodes 121 and 122 in a partial region, the dielectric material forming the dielectric patterns 141a, 141b, 142a, and 142b may be easily printed.

Also, in this case, adhesion between the dielectric patterns 141a, 141b, 142a, and 142b and the internal electrodes 121 and 122 may improve. Accordingly, since the bonding force between the margin portion and the active portion of the body 110-3 is strengthened, durability and reliability of the multilayer electronic component 101 may be secured. Thus, in spite of the deformation caused by sintering, reverse connection or separation between the margin portion and the active portion may be prevented.

According to the aforementioned example embodiment, the difference in reduction rates between the active portion having the composite structure in which the internal electrodes and the dielectric layers are disposed and the dielectric layer disposed on the margin portion on the side surface may be reduced, such that non-uniform deformation or reverse connection of the margin portion on the side surface may be prevented.

Also, a difference in reduction rates between the active portion having the composite structure in which the internal electrode and the dielectric layer are disposed and the cover portion disposed above and below the active portion may be reduced, such that that cracks at the boundary between the active portion and the cover may be prevented and reliability may be secured.

While the example embodiments have been illustrated and described above, it will be apparent to those skilled in the art that modifications and variations could be made without departing from the scope in the example embodiment as defined by the appended claims.

What is claimed is:

1. A multilayer electronic component, comprising:
a body including a plurality of first dielectric layers, an active portion in which internal electrodes are alternately disposed, and a cover portion disposed on the active portion in a first direction of the body, a direction in which the plurality of first dielectric layers are laminated, the cover portion including a second dielectric layer; and
an external electrode disposed externally on the body and connected to one of the internal electrodes,
wherein the body includes a margin portion covering all side surfaces of the one of the internal electrodes other than a side surface connected to the external electrode, and wherein the margin portion includes a dielectric pattern having a porosity higher than that of one of the plurality of first dielectric layers.

2. The multilayer electronic component of claim 1, wherein a porosity of the one of the plurality of first dielectric layers included in the active portion is different from a porosity of the cover portion.

3. The multilayer electronic component of claim 1, wherein the cover portion includes the second dielectric layers laminated on each other.

4. The multilayer electronic component of claim 1, wherein the cover portion includes the first dielectric layer and the second dielectric layer alternately disposed on each other.

5. The multilayer electronic component of claim 1, wherein a dielectric composition of the dielectric pattern and a dielectric composition of the second dielectric layer are the same.

6. The multilayer electronic component of claim 1, wherein an average size of dielectric grains of the one of the plurality of first dielectric layers disposed in a region overlapping the one of the internal electrodes in the active portion and an average size of dielectric grains disposed in the margin portion have a deviation of 50 nm or less therebetween.

7. The multilayer electronic component of claim 1, wherein a region of the dielectric pattern at least partially overlaps the one of the internal electrodes in the first direction.

8. The multilayer electronic component of claim 1, wherein, $0.3t2 \leq t1 \leq 0.9t2$, in which t1 is an average height of the dielectric pattern in the first direction and t2 is an average height of the one of the internal electrodes in the first direction.

9. The multilayer electronic component of claim 1, wherein $t3 > t1$, in which t1 is an average height of the dielectric pattern in the first direction and t3 is an average height of the one of the plurality of first dielectric layers in the first direction.

10. The multilayer electronic component of claim 1,
wherein the body includes first and second surfaces opposing each other in the first direction, third and fourth surfaces connected to the first and second surfaces and opposing each other in a second direction of the body, and fifth and sixth surfaces connected to the first to fourth surfaces and opposing each other in a third direction of the body, and
wherein the internal electrodes includes a first internal electrode connected to the third surface of the body and spaced apart from the fourth, fifth and sixth surfaces, and a second internal electrode connected to the fourth surface and spaced apart from the third, fifth and sixth surfaces.

11. A method of manufacturing a multilayer electronic component, the method comprising:
preparing a plurality of first ceramic green sheets on which a plurality of internal electrode patterns are respectively formed;
forming a dielectric material at least partially in a region other than the internal electrode patterns with respect to the plurality of first ceramic green sheets;
forming a laminate body by laminating the plurality of first ceramic green sheets such that adjacent internal electrodes of the internal electrode patterns intersect each other in a lamination direction in which the plurality of first ceramic green sheets are laminated, and laminating a second ceramic green sheet in the lamination direction on the plurality of first ceramic green sheets; and
preparing a body including an active portion including a first dielectric layer made of one of the plurality of first ceramic green sheets, an internal electrode made of one of the internal electrode patterns, and a dielectric pattern made of the dielectric material, and a cover portion including a second dielectric layer made of the second ceramic green sheet, by baking the laminate body,
wherein the dielectric pattern has a porosity higher than that of the first dielectric layer.

12. The method of claim 11, wherein, $A > C \geq B$, in which A is a volume fraction of a binder included in a material for forming the plurality of first ceramic green sheets, B is a volume fraction of a binder included in a material for forming the internal electrode patterns, and C is a volume fraction of a binder included in the dielectric material.

13. The method of claim 11, wherein a porosity of the first dielectric layer included in the active portion is different from a porosity of the cover portion.

14. The method of claim 11, wherein a dielectric composition of the second ceramic green sheet and a composition of the dielectric material are the same.

15. The method of claim 11, wherein the forming a dielectric material at least partially in a region other than the internal electrode patterns with respect to the plurality of first ceramic green sheets includes arranging the dielectric material such that a partial region thereof overlaps the internal electrode patterns.

16. The method of claim 11, wherein, $0.3t2 \leq t1 \leq 0.9t2$, in which t1 is an average height of the dielectric pattern in the lamination direction and t2 is an average height of the internal electrode in the lamination direction.

17. The method of claim 11, wherein $t3 > t1$, in which t1 is an average height of the dielectric pattern in the first direction and t3 is an average height of the first dielectric layer in the first direction.

18. A multilayer electronic component, comprising:
a body including first dielectric layers and internal electrodes alternately disposed, and a cover portion disposed on the active portion in a first direction of the body, a direction in which the first dielectric layers and the internal electrodes are laminated, the cover portion including a second dielectric layer; and
an external electrode disposed externally on the body and connected to one of the internal electrodes,
wherein the body includes a margin portion covering all side surfaces of the one of the internal electrodes other than a side surface connected to the external electrode,
the margin portion includes a dielectric pattern, and
an average size of dielectric grains of one of the first dielectric layers disposed in a region overlapping the one of the internal electrodes in the active portion and an average size of dielectric grains disposed in the margin portion have a deviation of 50 nm or less therebetween.

19. The multilayer electronic component of claim 18, wherein the cover portion includes the second dielectric layers laminated on each other.

20. The multilayer electronic component of claim 18, wherein the cover portion includes the first dielectric layer and the second dielectric layer alternately disposed on each other.

21. The multilayer electronic component of claim 18, wherein a dielectric composition of the dielectric pattern and a dielectric composition of the second dielectric layer are the same.

22. The multilayer electronic component of claim 18, wherein, $0.3t2 \leq t1 \leq 0.9t2$, in which t1 is an average height of the dielectric pattern in the first direction and t2 is an average height of the one of the internal electrodes in the first direction.

23. A multilayer electronic component, comprising:
a body including first dielectric layers and internal electrodes alternately disposed, and a cover portion disposed on the active portion in a first direction of the body, a direction in which the first dielectric layers and the internal electrodes are laminated, the cover portion including a second dielectric layer; and
an external electrode disposed externally on the body and connected to one of the internal electrodes,
wherein the body includes a margin portion covering all side surfaces of the one of the internal electrodes other than a side surface connected to the external electrode, the margin portion includes a dielectric pattern, and
a difference between an average size of dielectric grains of one of the first dielectric layers disposed in a region overlapping the one of the internal electrodes in the active portion and an average size of dielectric grains disposed in the margin portion, with respect to the average size of dielectric grains disposed in the margin portion, is 15.6% or less.

24. The multilayer electronic component of claim 23, wherein the cover portion includes the second dielectric layers laminated on each other.

25. The multilayer electronic component of claim 23, wherein the cover portion includes the first dielectric layer and the second dielectric layer alternately disposed on each other.

26. The multilayer electronic component of claim 23, wherein, $0.3t2 \leq t1 \leq 0.9t2$, in which t1 is an average height of the dielectric pattern in the first direction and t2 is an average height of the one of the internal electrodes in the first direction.

* * * * *